(No Model.)

G. M. KERNODLE.
JOURNAL BEARING.

No. 350,749. Patented Oct. 12, 1886.

Witnesses
Susie R. Seiler
R. W. Bishop

Inventor
George M. Kernodle
By his Attorneys,
R. S. & A. P. Lacey

UNITED STATES PATENT OFFICE.

GEORGE MILTON KERNODLE, OF CARTERSVILLE, GEORGIA.

JOURNAL-BEARING.

SPECIFICATION forming part of Letters Patent No. 350,749, dated October 12, 1886.

Application filed February 25, 1886. Serial No. 193,213. (No model.)

*To all whom it may concern:*

Be it known that I, GEORGE MILTON KERNODLE, a citizen of the United States, residing at Cartersville, in the county of Bartow and State of Georgia, have invented certain new and useful Improvements in Journal-Boxes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to bearings for car-axle journals; and it consists in the novel features shown, and more fully hereinafter set forth and claimed.

Figure 1:
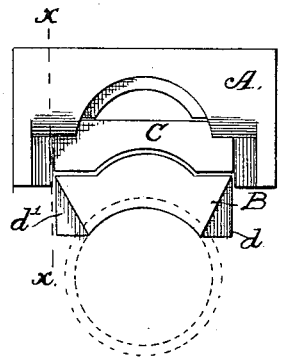
Figure 2:
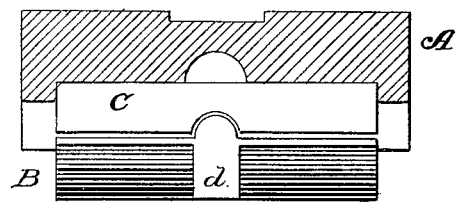
Figure 3:
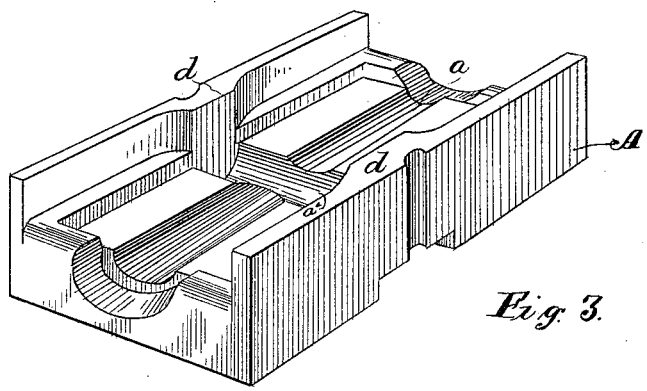
Figure 4:
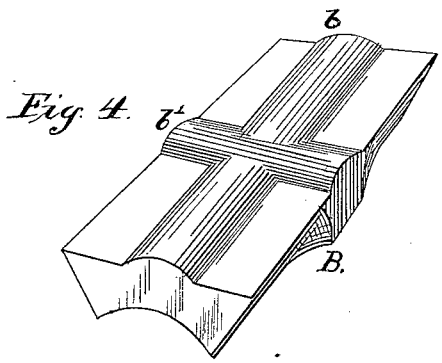
Figure 5:
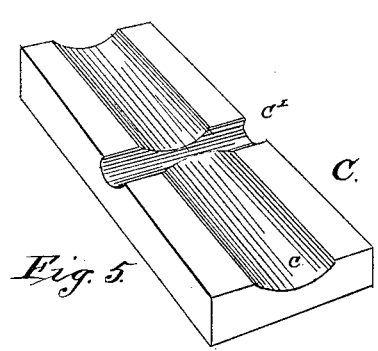

In the annexed drawings, Figure 1 is an end view of a journal-bearing constructed in accordance with the spirit of my invention. Fig. 2 is a longitudinal section thereof on the line $x\ x$, Fig. 1. Fig. 3 is a perspective detail of the grease-box. Fig. 4 is a perspective view of the bearing. Fig. 5 is a perspective view of the wedge or plate interposed between the bearing and the grease-box.

The grease-box A is adapted to fit a journal-box of ordinary construction, and the bearings B are constructed of varying sizes, with a view to fit the grease-box. The latter, when specially manufactured to receive the bearings, has a longitudinal groove, $a$, and a transverse groove, $a'$, formed on its inner side, in which corresponding ribs or raised portions, $b\ b'$, on the back of the bearing are seated, to prevent lateral and longitudinal displacement of said bearing. The groove $a'$ is somewhat deeper than the groove $a$, and the corresponding rib, $b'$, projects beyond the plane of the rib $b$ sufficiently far, so that normally a space is left between the bearing and its support on each side of the cross-rib $b'$, to permit a slight movement of the bearing to accommodate itself to the inclination of the axle when making curves. The curvilinear form of these grooves and ribs in cross-section has been found to give the best results, although it may be varied without departing from the nature of my invention.

In order to make the bearing more universal in its application to journal-boxes now in use, a wedge or plate, C, is employed and interposed between the bearing B and journal or grease box. The wedge is of a shape and size to fit the box, and its inner face is provided with longitudinal and cross grooves $c\ c'$, respectively coinciding with the ribs $b\ b'$ on the back of the bearing. The wedge may be used in connection with a box of the hereinbefore-described construction, if desired, as shown in Figs. 1 and 2. The main purpose, however, is to adapt the bearing B to boxes of the present construction at a minimum expense.

The back of the bearing may be straight; but it is preferred to make it slightly convex in its longitudinal length, to give it more play about the rib $b'$ when adjusting itself to the inclination of the axle.

To diminish the friction between the bearing and box and prevent binding, the sides of the box opposite the transverse grooves are projected inward, forming abutments $d$, which contact with corresponding raised portions, $d'$, on the edges of the bearing.

Having thus described my invention, what I claim, and desire to secure by Letters Patent, is—

1. The combination, with a bearing having a longitudinal and a cross rib on its back, of a support provided with corresponding longitudinal and cross grooves, substantially as and for the purpose set forth.

2. The combination of a bearing and support provided with coacting longitudinal and cross ribs and grooves to prevent longitudinal and lateral displacement, said cross-ribs being projected to form a fulcrum about which the bearing rocks, substantially as and for the purpose specified.

3. The combination, with a box and a wedge having longitudinal and cross grooves, of a bearing provided with corresponding longitudinal and cross ribs and adapted to rock on the cross ribs, as and for the purpose set forth.

In testimony whereof I affix my signature in presence of two witnesses.

GEORGE MILTON KERNODLE.

Witnesses:
JESSE A. BAKER,
W. E. PRUEKETT.